US011695368B2

(12) United States Patent
Brown et al.

(10) Patent No.: US 11,695,368 B2
(45) Date of Patent: Jul. 4, 2023

(54) MODULAR POWER SUPPLY APPARATUSES AND METHODS FOR USING SAME

(71) Applicant: Richland County School District Two, Columbia, SC (US)

(72) Inventors: M'Chaelah A. Brown, Columbia, SC (US); Andrea V. Cerda, Hollywood, FL (US); Ronald J. Fowler, Blythewood, SC (US); Omar A. Herrera, Columbia, SC (US); Jeremiah L. Lynch, Harrisburg, NC (US); Murray P. McDaniel, Columbia, SC (US); Nithin Saravanapandian, Columbia, SC (US); Anaiah S. Thompson, Blythewood, SC (US); Laila C. Thompson, Hampton, GA (US); Kirstin O. Bullington, Elgin, SC (US); Robin L. Jones, Columbia, SC (US)

(73) Assignee: RICHLAND COUNTY SCHOOL DISTRICT TWO, Columbia, SC (US)

( * ) Notice: Subject to any disclaimer, the term of this patent is extended or adjusted under 35 U.S.C. 154(b) by 289 days.

(21) Appl. No.: 16/903,539

(22) Filed: Jun. 17, 2020

(65) Prior Publication Data
US 2020/0395884 A1 Dec. 17, 2020

Related U.S. Application Data

(60) Provisional application No. 62/862,405, filed on Jun. 17, 2019.

(51) Int. Cl.
*H02S 10/40* (2014.01)
*H02J 7/35* (2006.01)
*H02S 40/38* (2014.01)
*H02S 40/34* (2014.01)
*H02S 40/32* (2014.01)

(52) U.S. Cl.
CPC ............... *H02S 10/40* (2014.12); *H02J 7/35* (2013.01); *H02S 40/32* (2014.12); *H02S 40/34* (2014.12); *H02S 40/38* (2014.12)

(58) Field of Classification Search
None
See application file for complete search history.

(56) References Cited

U.S. PATENT DOCUMENTS

| 8,212,142 | B2 | 7/2012 | Lyman et al. | |
|---|---|---|---|---|
| 2009/0140689 | A1 | 6/2009 | Lee | |
| 2012/0043937 | A1 | 2/2012 | Williams | |
| 2015/0288319 | A1* | 10/2015 | Hartman | H02S 20/30 136/246 |
| 2018/0302021 | A1* | 10/2018 | Hall | H02J 7/34 |
| 2020/0252022 | A1* | 8/2020 | Larsen | H02S 10/40 |

OTHER PUBLICATIONS

Phoenix Contact, "Components and systems for photovoltaics", https://www.mouser.com/pdfdocs/Solar-Phoenix_Contact-Components%20and%20systems%20for%20Photovoltaics.pdf, All Pages, 2015. (Year: 2015).*

* cited by examiner

*Primary Examiner* — Daniel P Malley, Jr.
(74) *Attorney, Agent, or Firm* — Burr & Forman LLP; Douglas L. Lineberry

(57) ABSTRACT

A modular power supply apparatus for use in harsh climates that comprises a portable, low cost, easily maintained, durable power supply for energy production as well as systems, methods for forming, and methods of using same.

9 Claims, 17 Drawing Sheets

TABLE 1

| Part | Qty | CPU | Cost |
|---|---|---|---|
| 3 W (12V) Solar Panel | 1 | 10.99 | 10.99 |
| Diode | 1 | 0.0583 | 0.0583 |
| Banana jack pair | 2 | 0.36725 | 0.7345 |
| USB Step Down Transformer | 1 | 6.69 | 6.69 |
| Switches | 2 | 1.099 | 2.198 |
| Terminal Block | 1 | 2.162 | 2.162 |
| 22 AWG stranded wire, 1 ft | 1 | 0.4392 | 0.4392 |
| Balsa wood, top and bottom of module | 2 | 1.436875 | 2.87375 |
| Balsa wood, sides of box (6.5 inches) | 4 | 0.963 | 3.852 |
| Hinges | 2 | 0.1798 | 0.3596 |
| Velcro (optional), 6 inches | 1 | 0.68 | 0.68 |
| Rechargeable AA batteries | 6 | 1.436875 | 8.62125 |
| Battery holder | 1 | 1.478 | 1.478 |
| TOTAL | | | 41.1366 |

FIGURE 11

Sustainability Comparison of Module Box; Pine wood vs. PLA

Carbon (kg CO$_2$)

| Stage of Product Life Cycle | Wood (Pine) | PLA (3D Printing Filament) | Percent Change |
|---|---|---|---|
| Material | 0.026 | 0.961 | -97.29448491 |
| Manufacturing | 0 | 0.3272 | -100 |
| Use | n/a | n/a | n/a |
| End of Life | 0.052 | 0.152 | -65.78947368 |
| Transportation | 0.0015 | 0.0079 | -81.01265823 |

Energy Consumption (MJ)

| Stage of Product Life Cycle | Wood (Pine) | PLA (3D Printing Filament) | Percent Change |
|---|---|---|---|
| Material | 0.137 | 22 | -99.37727273 |
| Manufacturing | 0 | 5.4 | -100 |
| Use | n/a | n/a | n/a |
| End of Life | 0.036 | 0.109 | -66.97247706 |
| Transportation | 0.018 | 0.096 | -81.25 |

Air Acidification (kg SO$_2$)

| Stage of Product Life Cycle | Wood (Pine) | PLA (3D Printing Filament) | Percent Change |
|---|---|---|---|
| Material | 0.000053 | 0.0032 | -98.34375 |
| Manufacturing | 0 | 0.000025 | -100 |
| Use | n/a | n/a | n/a |
| End of Life | 0.000019 | 0.00006 | -68.33333333 |
| Transportation | 0.000048 | 0.00025 | -80.8 |

FIGURE 13

| Stage of Product Life Cycle | Water Eutrophication (kg PO4) | | |
|---|---|---|---|
| | Wood (Pine) | PLA (3D Printing Filament) | Percent Change |
| Material | 0.000011 | 0.00039 | -97.17948718 |
| Manufacturing | 0 | 0.000092 | -100 |
| Use | n/a | n/a | n/a |
| End of Life | 0.000085 | 0.00025 | -66 |
| Transportation | 0.0000045 | 0.000024 | -81.25 |

FIGURE 13 (CONT.)

MODULAR POWER SUPPLY APPARATUSES AND METHODS FOR USING SAME

BACKGROUND OF THE INVENTION

1) Field of the Invention

The present disclosure relates to a modular power supply apparatus for use in harsh climates that comprises a portable, low cost, easily maintained, durable power supply for energy production as well as systems, methods for forming, and methods of using same.

2) Description of Related Art

The present disclosure, in some embodiments thereof, relates to power generation and, more particularly, but not exclusively, to a renewable and scalable power generation solution. Energy is a central issue the world faces today, as it is essential for powering our lives and sustainable communities. One goal the United Nations wishes to achieve by year 2030 is to ensure universal access to affordable, reliable, renewable, and modern energy services. The world is far from achieving this goal. Currently, an estimated sixteen (16) percent of the world's population—one point two (1.2) billion people—have little or no access to electricity: fifty percent (50%) of those without electricity live in Sub-Saharan Africa. While developments have been made, more access to clean fuel and more renewable or cleaner technology must be provided.

Many developments have been made in recent years advancing renewable energy technologies, and many patents exist for solar and solar hybrid chargers. One attempt to solve renewable energy problems is described in U.S. Pat. No. 8,212,142, the disclosure of which is incorporated herein in its entirety. Additional work includes U.S. Pat. App. Pub. 20090140689 to Lee and U.S. Pat. App. Pub. 20120043937 to Williams, the disclosures of which are incorporated herein in their entireties.

Accordingly, it is an object of the present disclosure to provide a portable, low cost, easily maintained, durable modular power supply apparatus that may be used in harsh environments for production of energy.

SUMMARY OF THE INVENTION

The above objectives are accomplished according to the present invention by providing in a first embodiment, a modular power supply apparatus. The apparatus may include at least one removable solar panel capable of being repeatedly repositioned manually on a modular power supply shell, at least one terminal block, at least one switch, at least one rechargeable battery, at least one electrical connector; and at least one power output. Further, the at least one battery may be an external battery. Again, at least two modular power supply apparatus may be connected in parallel, series, or both parallel and series, reversibly, with one another. Yet still, the modular power supply apparatus may be formed to removably engage and disengage from a second modular power supply apparatus. Still further, the modular power supply and second modular power supply may have mated electrical connectors to enable connection to one another reversibly. Yet again, a connection rail may be configured to electrically connect the modular power supply apparatus to a second modular power supply apparatus. Still further, the apparatus may include at least one inverter. Again further, the solar panel may only be manually repositioned via changing position of the at least one solar cell on an attachment. Still yet further, the modular power supply apparatus may be mobile.

In an alternative embodiment, a method is provided for creating a modular power supply system. The method may include forming at least one modular power supply apparatus from locality sourced materials, pivotally affixing at least one solar panel to the modular power supply apparatus, wherein the at least one solar panel may be repositioned manually; and enabling different system output voltage and/or current by placing at least two power supply apparatuses in different combinations of serial and/or parallel with respect to one another. Further, an apparatus shell may be formed from locally available wood. Still yet, a connection rail may be formed to connect the modular power supply to a second modular power supply. Further, at least two modular power supply apparatus may be connected in parallel, series, or both parallel and series, reversibly with one another. Yet further, the modular power supply apparatus may be configured to removably engage and disengage from a second modular power supply apparatus. Again, the at least two modular power supply apparatus may be formed with mated electrical connectors to enable connection to one another reversibly. Still yet, a connection rail may electrically connect the at least two modular power supply apparatus to one another. Further again, at least one inverter may be included in the apparatus. Still further, the solar panel may be configured to only be manually repositioned via changing position of the at least one solar cell on a shell of the modular power supply apparatus.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 11 shows Table 1, a sample parts and cost list for a modular power apparatus of the current disclosure.

FIG. 13 shows Table 2, Sustainability Comparison of Module Box; Pine wood vs. PLA.

Figure 1:
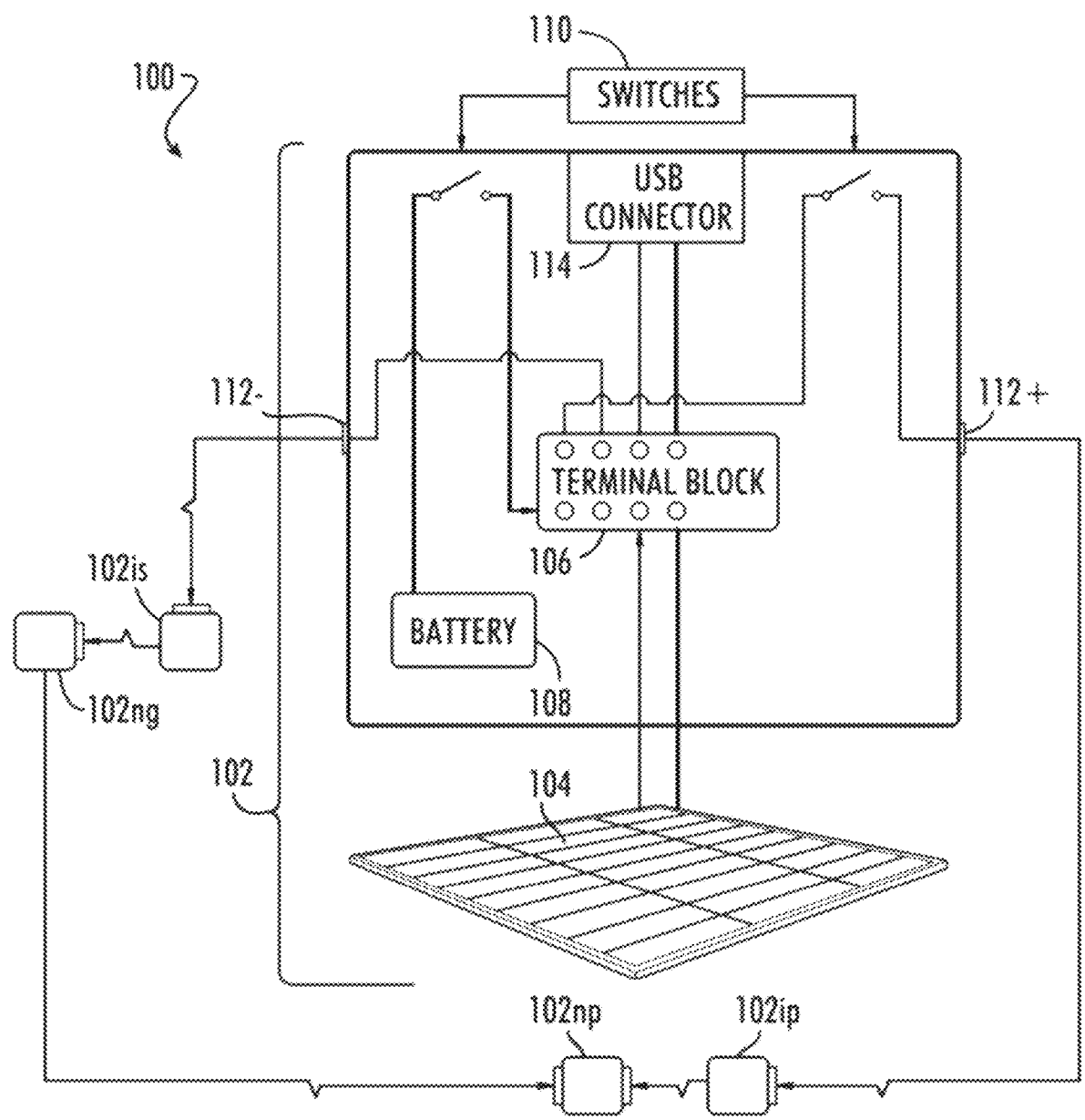
FIG. 1 shows a block diagram of an individual modular power supply apparatus in a system of modular power supply apparatuses.

It will be understood by those skilled in the art that one or more aspects of this disclosure can meet certain objectives, while one or more other aspects can meet certain other objectives. Each objective may not apply equally, in all its respects, to every aspect of this disclosure. As such, the preceding objects can be viewed in the alternative with respect to any one aspect of this disclosure. These and other objects and features of the disclosure will become more fully apparent when the following detailed description is read in conjunction with the accompanying figures and examples. However, it is to be understood that both the foregoing summary of the disclosure and the following detailed description are of a preferred embodiment and not restrictive of the disclosure or other alternate embodiments of the disclosure. In particular, while the disclosure is described herein with reference to a number of specific embodiments, it will be appreciated that the description is illustrative of the disclosure and is not constructed as limiting of the disclosure. Various modifications and applications may occur to those who are skilled in the art, without departing from the spirit and the scope of the disclosure, as described by the appended claims. Likewise, other objects, features, benefits and advantages of the present disclosure will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the disclosure will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

In one embodiment, the current disclosure provides a system of modular power supply apparatuses, forming an array in series and/or in parallel. There is further provided in accordance with an aspect of the disclosure, a method of using a modular power supply apparatus, comprising: performing at least one of, checking that the switches are in the appropriate positions for intended operation, placing the modular power supply in the sun, or at least in partial sun, to generate power, charging at least one of an internal battery and external battery, and/or, powering an electrical appliance.

In a further embodiment of the disclosure, the method further comprises pivoting the solar panel. In an embodiment of the disclosure, the method further comprises bringing the modular power supply indoors for use and/or for protection.

There is further provided in accordance with an aspect of the disclosure, a method of using a system of modular power supply apparatuses, comprising: performing at least one of, placing switches in desired positions for operation, connecting a plurality of modular power supply apparatuses in series and/or connecting a plurality of modular power supply apparatuses in parallel, connecting at least one of an internal battery, external battery and an electrical appliance to the plurality of modular power supply apparatuses, placing the system in the sun for initiating solar energy power generation, and moving the system indoors for use and/or for protection. The connecting actions may be reversible in order and/or placing can be performed before any of the connecting. Further, moving indoors can be performed before connecting an electrical appliance to the system.

As context for the detailed description of various embodiments of the disclosure herein, it should be understood the described renewable and/or scalable power generation solutions find application not only for general use, but also for a specific and real-life predicament. Building on the success of a previous solar study light project conducted in cooperation with The Richland Two Institute of Innovation of Richland County School District 2 located in Columbia, S.C., USA, a principal of a secondary school in Sare Bilaly, Senegal requested another power generation related solution for a specific problem. The Richland Two Institute of Innovation InvenTeam, comprised of high school students and sponsored in part by the Lemelson-MIT Program responded with the solution described herein.

Namely, the Senegalese school was given a photocopier, but there is no consistent access to electricity in Sare Bilaly. At first, this may not seem like an urgent problem, but the school does not have any print resources at all. Students learn by lecture and copying notes from the chalkboard into their notebooks. As a result, the 343 students, who come from 43 surrounding villages, only have a 24% pass rate on the national exams. These students range in age from 12-20, and only have two attempts to repeat the same grade when they fail the national exam. Because education is not compulsory at this level, many students drop out of secondary school after failing exams, especially female students, who face social pressure for early marriage.

Access to more educational materials could help keep more students in school and give them a greater chance at improving their futures. Currently, in order to provide study resources, teachers travel to Kolda, Senegal to make copies, which is too expensive and inconvenient to do on a regular basis. Generally, it was decided that a solution was needed which utilized renewable sources of energy, could be constructed cheaply and largely with materials available locally (e.g., in the Kolda, Senegal region), which could be maintained locally with the simplest of tools and parts, which was portable (e.g., to bring it in at night and take it out during the day to keep it safe from theft, cattle herds and other animal life, as well as sand and wind during the dry season), which provided adaptable power output levels and/or which was scalable.

The current disclosure is not necessarily limited in its application to the details of construction and the arrangement of the components and/or methods set forth in the following description and/or illustrated in the drawings and/or the Example. The current disclosure is capable of other embodiments or of being practiced or carried out in various ways.

FIG. 1 is a schematic circuit/block diagram of an individual modular power supply apparatus 102 in a system 100 of modular power supply apparatuses 102, some in serial connection 102*is* . . . 102*ns* to modular power supply apparatus 102, and some in parallel connection 102*ip* . . . . In an embodiment of the disclosure, a modular power supply apparatus 102 includes at least one of a solar panel 104, a terminal block 106, at least one battery 108, at least one switch 110, at least one electrical connector 112+, 112− (e.g. a banana jack), and/or an electrical power output 114 (such as a USB connector or other output as known to those of skill in the art).

In one embodiment, voltage output increased in a series circuit (by adding more power supply apparatuses together in series), and the current is increased in a parallel circuit (by adding more power supply apparatuses together in parallel), wherein connecting an array in series and/or in parallel is described herein below. It should be understood that in some embodiments, the modular power supply apparatus 108 does not include an internal battery 108 and is instead connected to an external battery and/or an electrical appliance (e.g. through electrical power output 114).

Power supply apparatuses 102, 102*i* . . . 102*n* may be interlocking and/or may be connectable to be in electrical communication in parallel and/or serial configuration and/or are interchangeable. Power supply apparatuses 102, 102*i* . . . 102*n* may snap and/or reversibly and/or mechanically connect together. Additionally, alternatively and/or optionally, power supply apparatuses 102, 102*i* . . . 102*n* may removably attach to each other using adhesive, hook and pile fasteners, electrical connectors themselves, and/or external arms/rails/connectors/brackets/supports, and the like, for mechanical and/or electrical connection.

It should be understood that while it is described herein that a plurality of modular power supply apparatuses can interconnect in an array, even a single power supply apparatus 102 could also be used to generate and output power, for example using a USB connector as a power output.

Modular power supply apparatus 102 may at least be partly constructed of materials which are sourced from the locality where they are used. "Locality sourced" as used herein denotes raw materials available in the area where the power supply is used without requiring import of the materials into the area. In some embodiments, the structure of the modular power supply apparatus 102 may constructed of wood, such as balsa wood. Modular power supply apparatus 102 may also be constructed from a 3-D printer compatible material. Optionally, modular power supply apparatus 102 may be constructed of a metal and/or a polymer and/or recycled materials and/or a combination of materials.

Figure 2:
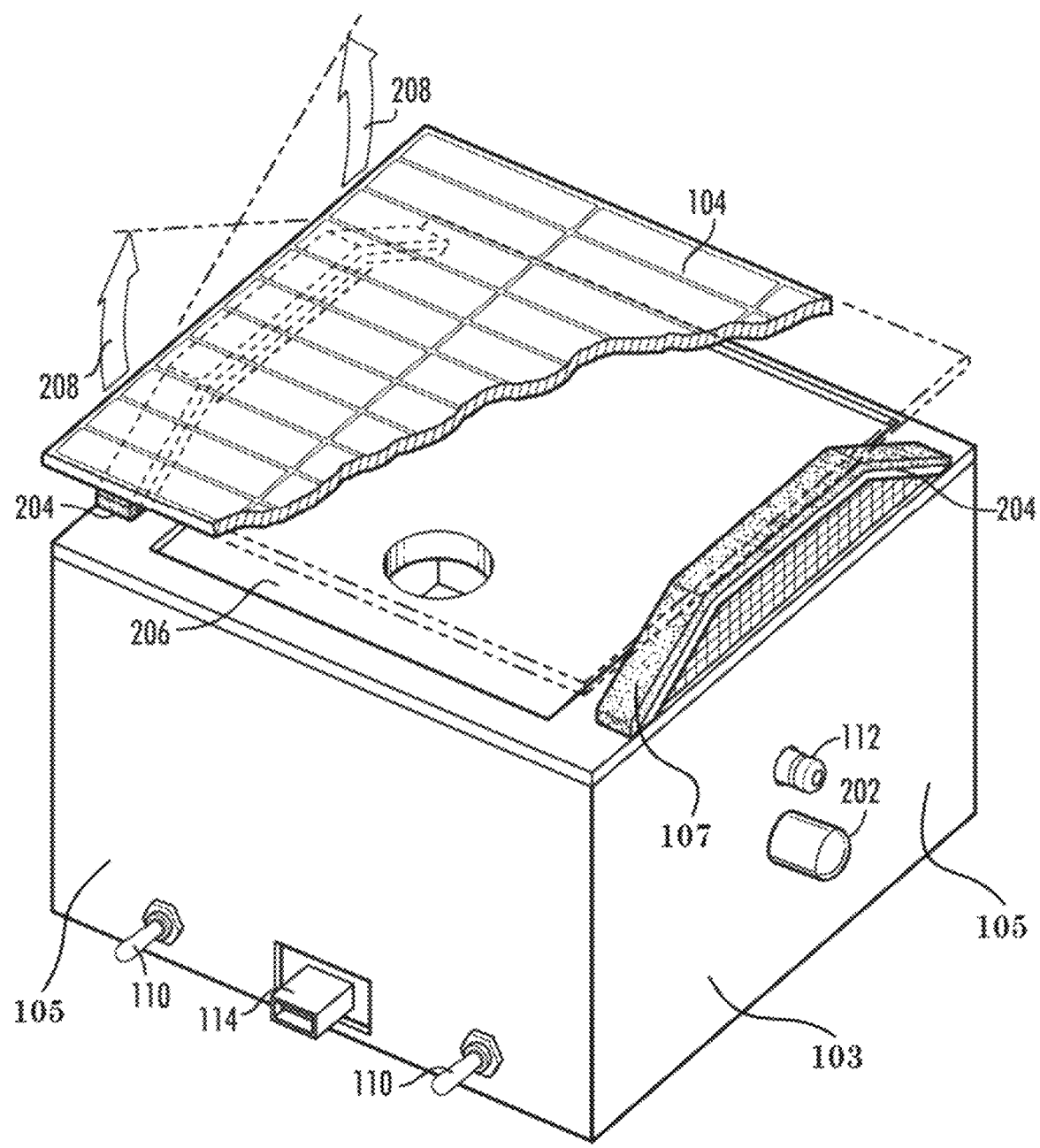
FIG. 2 is a perspective view of a modular power supply apparatus (cover closed)

FIG. 2 is a perspective view of a modular power supply apparatus 102 with cover 206 closed. In an embodiment of the disclosure, solar panel 104 may be pivotally 208 attached to outer shell 103 of apparatus 102, optionally on an arch-shaped pivot 204 structure, such that the solar panel 104 can be angled. "Angling" includes repositioning solar panel 104 along exterior 107 of arch-shaped pivot 204 to change the orientation of solar panel 204 with respect to the sun in the X, Y, and/or Z directions with respect to the sun's arc across the sky. Solar panel 104 may also be affixed at any side 105 of outer shell 103 as well. It is conceived that the angling ability of the solar panel 104 in combination with the pivot 204 will enable more efficient solar power collection and, therefore, power generation. Thus, solar panel 104 may be moved in the X, Y and Z directions via being affixed to apparatus 102 at arch 204 and/or sides 105, such that solar panel 104 may be manually repositioned to "catch" the sun during the course of the day. While solar panel 104 may be mechanically configured to rotate/move automatically, one purpose of the current disclosure is to provide a robust, hearty, and mechanically simple device capable of managing harsh climes and treatment on a frequent basis. In one aspect, because of the foregoing, the solar panel may be only manually repositioned to avoid having to include extraneous controls, motors, positioning sensors, etc., in the power supply device.

It should be understood that because the modular power supply apparatus 102 is intended to, and is configured for, use with multiple other power supply apparatuses, connectors/connections are designed so that each of the power supply apparatuses is identical, but also plugs into and/or connects with the next power supply apparatus. In an embodiment of the disclosure, this is achieved by having male/female counterparts, for example, a protrusion 202 (such as for example and not intended to be limiting a peg or knob) is disposed on a side of the power supply apparatus 102 such that it mates with a counterpart depression 402 or hole (shown and described in more detail with respect to FIG. 4A) on an opposing side of a contiguous power supply apparatus or with a depression or gap in a connecting rail, such as described elsewhere herein. Additionally, alternatively and/or optionally, electrical connectors may also be configured to be male/female from one power supply apparatus to the next power supply apparatus so that contiguous power supply apparatuses can be connected together while also being identical in design.

It should also be understood that while the power supply apparatus 102 is shown in FIG. 2 as having a body exhibiting a box-like shape, it could conceivably be of any shape, for example triangular, pentagonal, hexagonal, etc. In some embodiments, solar panel 104 is moveable to any of sides 105 of the power supply apparatus 102 and/or multiple solar panels may be attached (optionally, removably) to the power supply apparatus 102.

Figure 3:
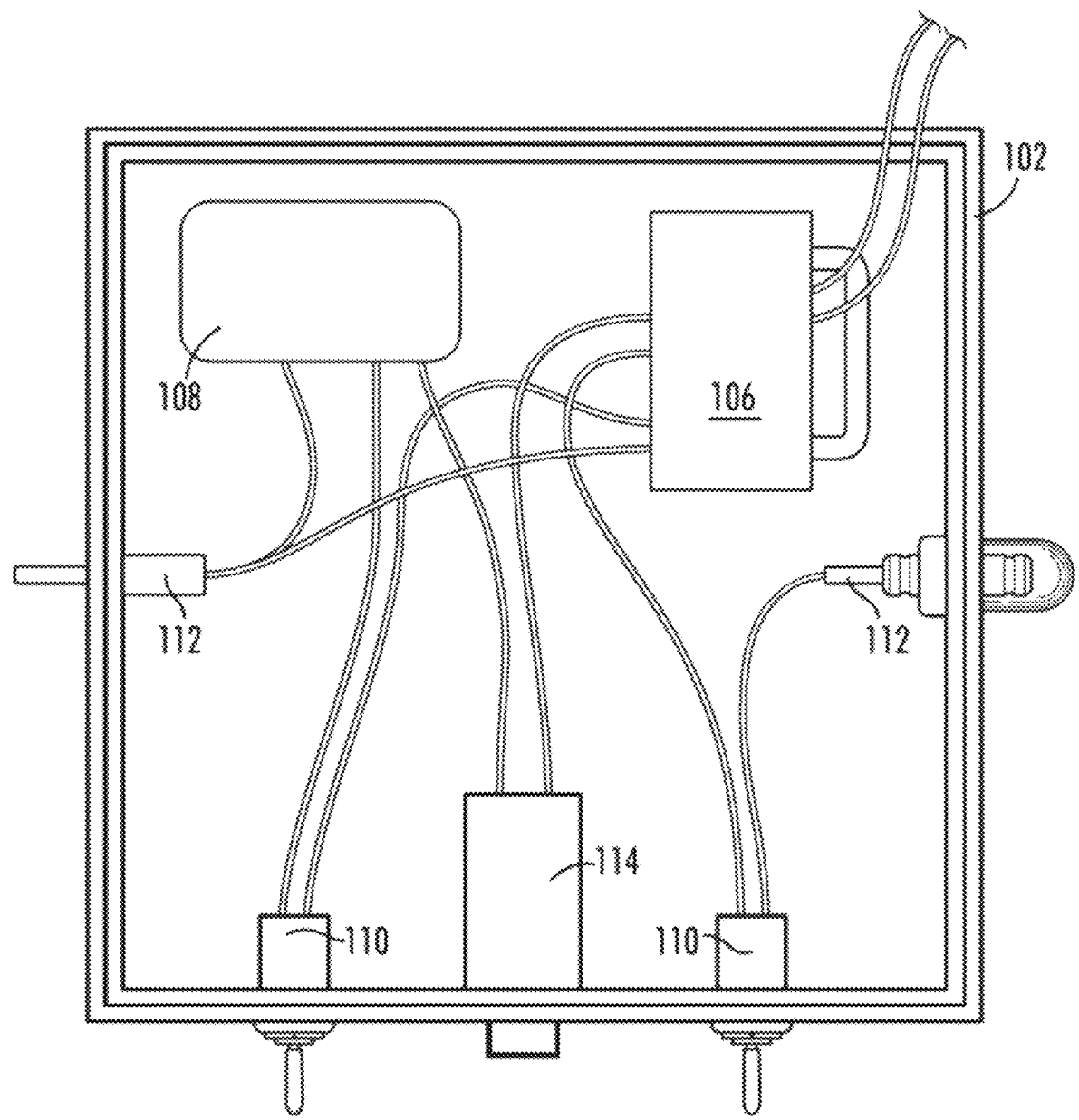
FIG. 3 is a top view of a modular power supply apparatus with the cover open.

FIG. 3 is a top view of a modular power supply apparatus 102 with the cover 206 (not shown) open. In an embodiment of the disclosure, each modular power supply apparatus 102 includes at least one of: a 3-watt solar cell (12 V, 0.25 A) 104; with a step-down transformer; and at least one (optionally, two) switch(es) 110 to route the current to an internal rechargeable battery pack 108 allowing the modular power supply apparatus 102 to be used independently as a small study light or 5 Volt USB 114 charger that can last for at least one hour.

When combined, a plurality of modular power supply apparatuses 102 . . . 102*n* may be combined in various serial and parallel combinations to attain the power generation requirements (e.g. voltage and current) desired to charge (e.g. trickle charge) at least one external battery and/or to power an electrical appliance. In some embodiments, an inverter 802 (shown and described in more detail with respect to FIG. 8) is used to convert the DC power produced by the battery(ies) to AC power for provision to the electrical appliance.

Figure 4A:
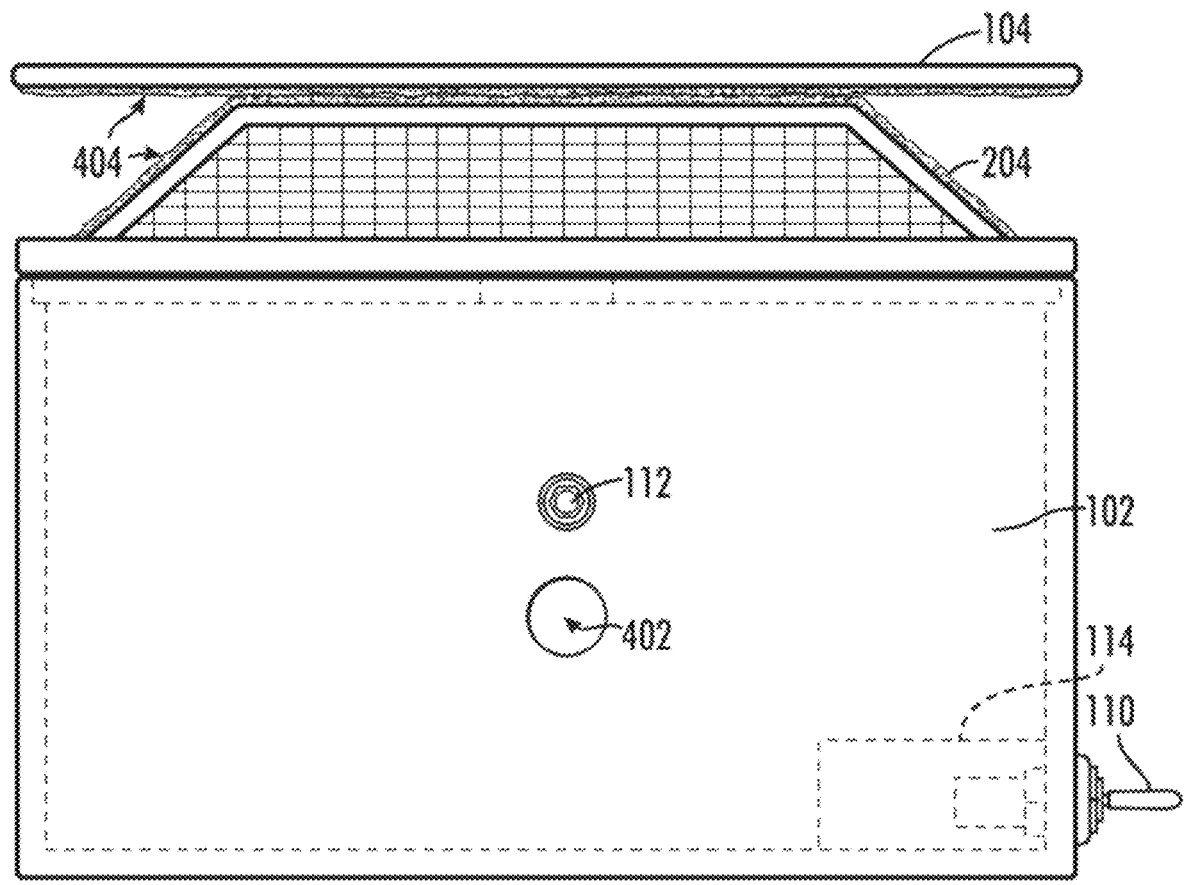
FIGS. 4A and 4B are left and right views of a modular power supply apparatus, respectively.
Figure 4B:
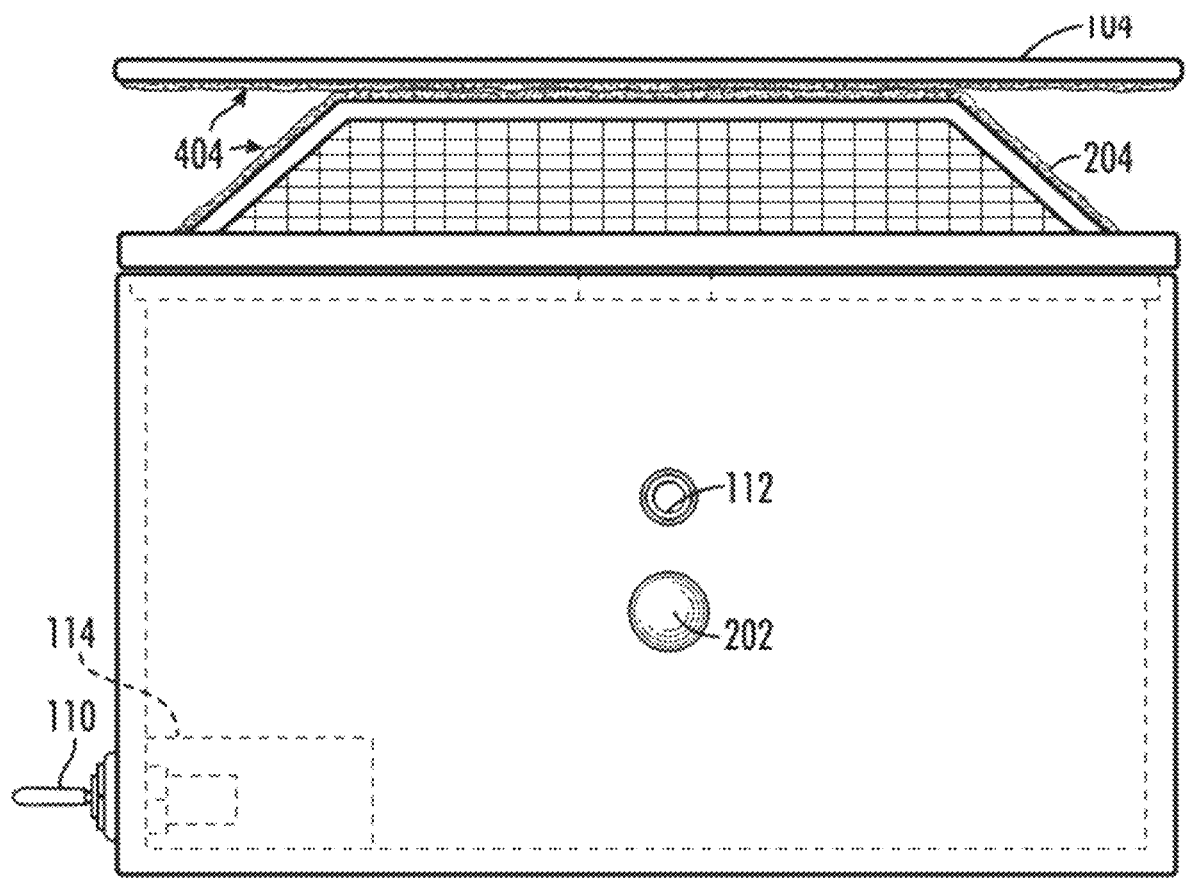

It should be understood that, as shown in FIG. 3, the basic electrical components are relatively simple and can be built and/or maintained with minimal electricity-related education and/or cheap and/or readily available parts. FIGS. 4A and 4B are left and right views of a modular power supply apparatus 102, respectively. From the left side view of FIG. 4A, a male banana clip 112+ is shown which is used to electrically connect this modular power supply apparatus 102 to a similar, second modular power supply apparatus next to it (only the second one would have its right side with a female connector as a counterpart to the male banana clip). In some embodiments of the disclosure, the depression/recess/hole 402 is used to mechanically connect this power supply apparatus 102 to a second one next to it, by acting as a counterpart to the prong 202 of the second modular power supply apparatus. FIGS. 4A and 4B also show that the solar panel 104 is removably connected to an attachment, such as a pivot arch 204, that allows the panel to move in the X, Y and/or Z dimensions with respect to the position of the sun and the apparatus. This may be accomplished, for purposes of example only and not intended to be limiting, by hook and pile fasteners 404, such that the solar panel 104 can be removed from the box and/or moved on the pivot 204 for angling the solar panel 104 into a more efficient solar energy collecting configuration. This does away with and eliminates the need for complex, and likely to break, repositioning systems as the user simply manually repositions the solar cell to maximize solar exposure of the solar cell.

Figure 5A:
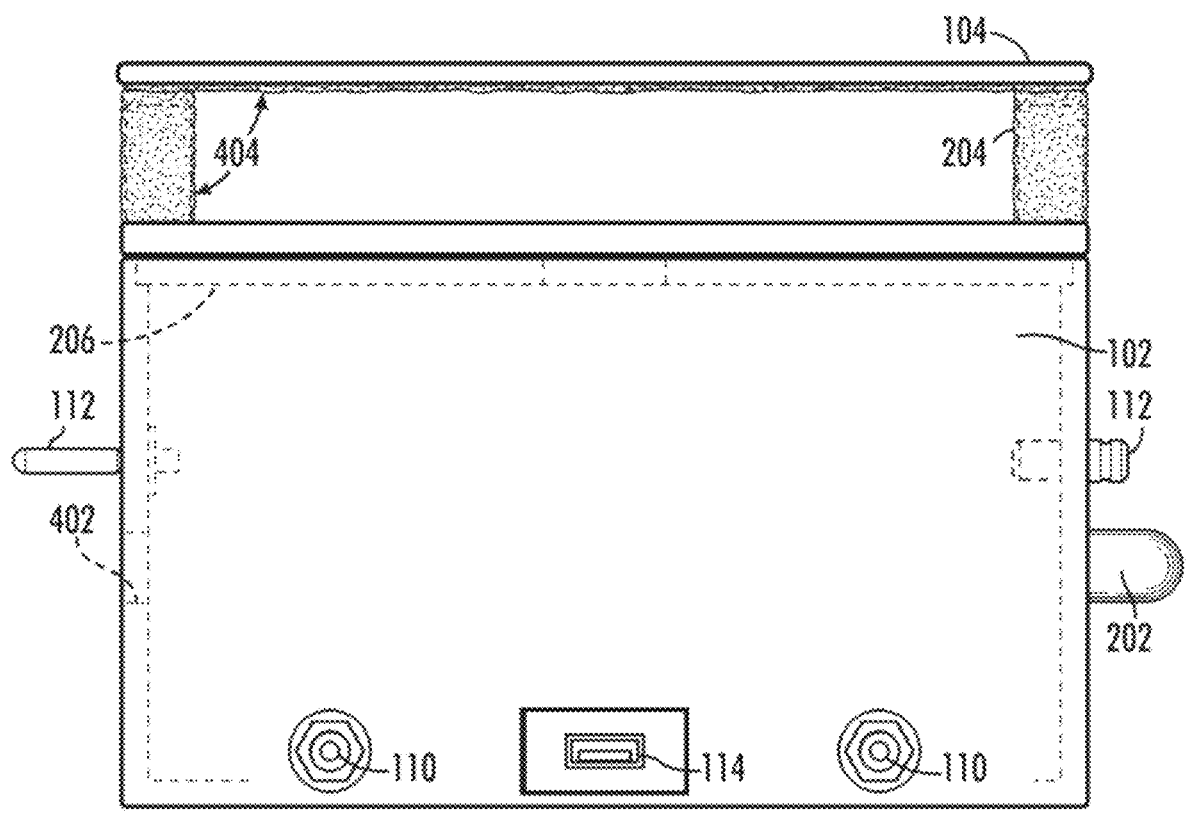
FIGS. 5A and 5B are front and back views of a modular power supply apparatus, respectively.
Figure 5B:
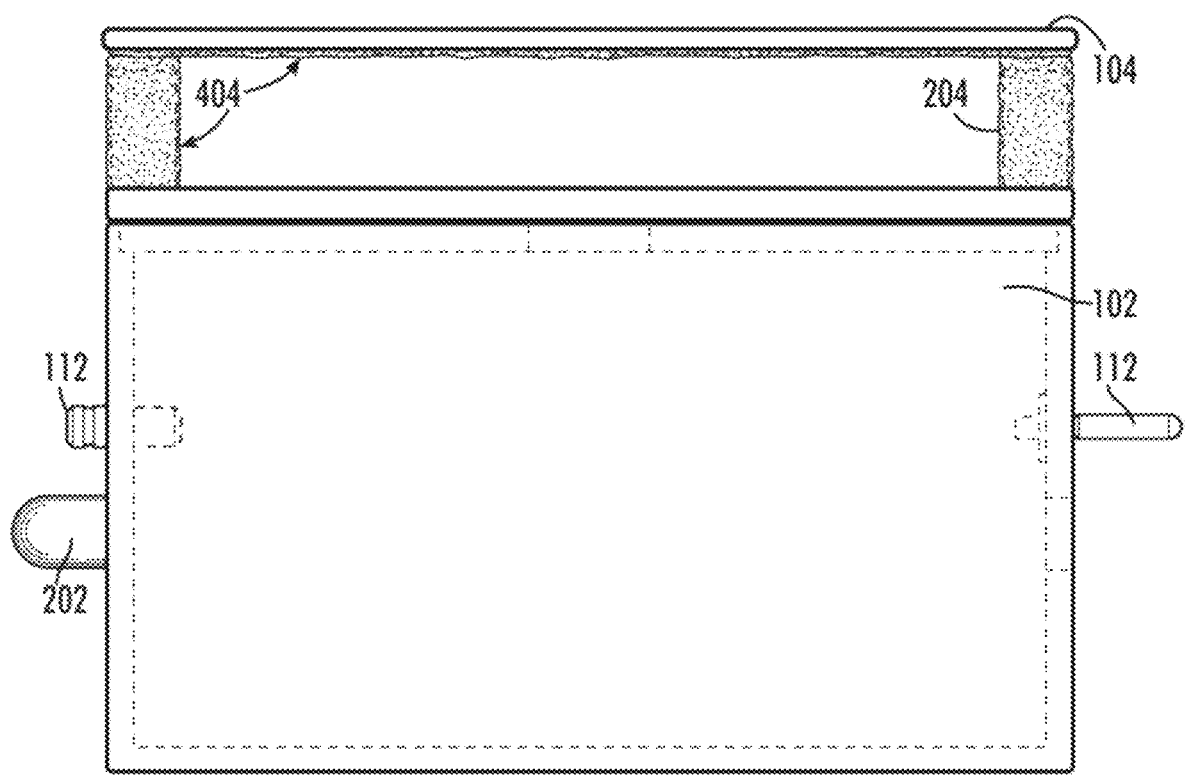

FIGS. 5A and 5B are front and back views of a modular power supply apparatus 102, respectively. In FIG. 5A, the switches 110 are displayed in more detail, which when combined with the schematic circuit/block diagram of FIG. 1 shows that the switch on the left (taken from the perspective of FIG. 5A) controls electrical circuit flow between power supply apparatuses 102, 102is, 102ns connected in series. In some embodiments of the disclosure, the right switch (taken from the perspective of FIG. 5A) controls electrical circuit flow from the battery to the electrical output 114 or elsewhere.

Figure 6:
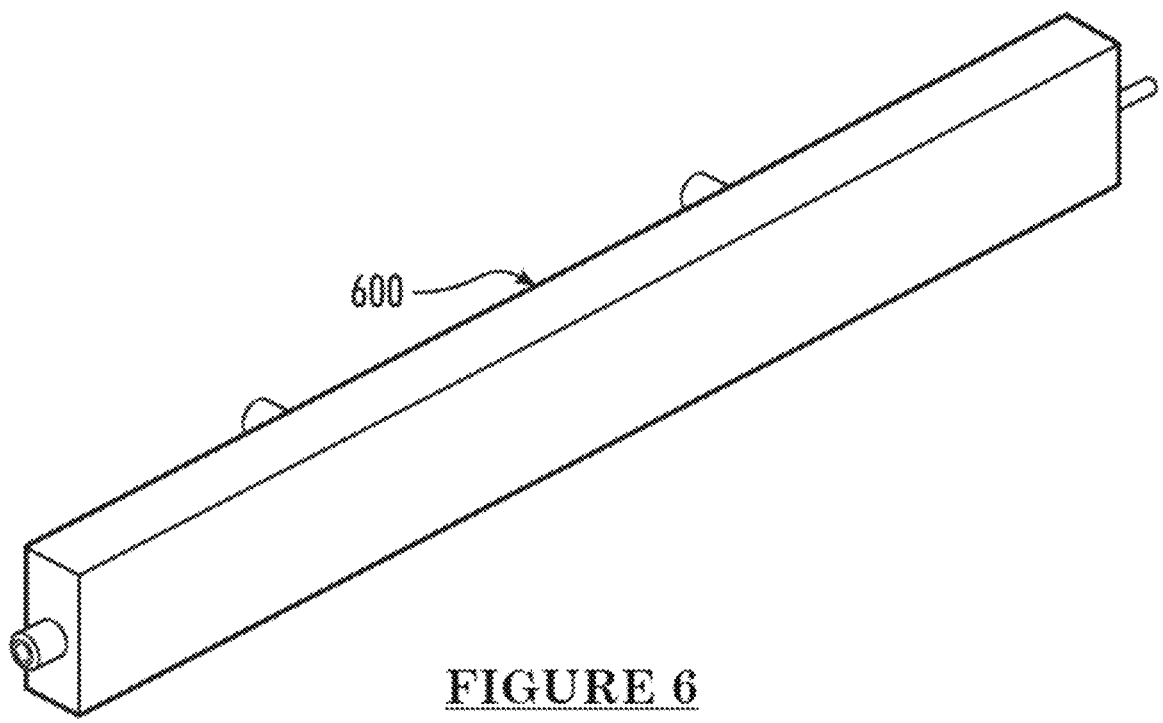
FIG. 6 is a perspective view of a connecting rail.

FIG. 6 is a perspective view of a connecting rail 600, which may be used to connect a plurality of modular power supply apparatuses in parallel. In some embodiments of the disclosure, connecting rail 600 is configured as a counterpart to the right side of the modular power supply apparatus 102, that is, connecting rail 600 includes a male electrical connector 112, which inserts into the female electrical connector 112—located on the right side of the modular power supply apparatus 102. In some embodiments, connecting rail 600 is configured as a counterpart to the left side of the modular power supply apparatus 102, that is, connecting rail 600 includes a female electrical connector 112, which receives the male electrical connector 112+ located on the left side of the modular power supply apparatus 102. As with the electrical connectors, connecting rail 600 may be provided with a male or female peg or recess which assists with mechanical stability of the system when connecting rails are used.

In some embodiments of the disclosure, there are left/right or male/female connecting rails. In some embodiments of the disclosure, the rails exhibit the same configuration, whether right or left and connectors or adapters are used to provide proper counterpart pieces to the modular power supply apparatuses. In some embodiments, electrical connectors 112 of power supply apparatuses 102 may be interchangeable, reversible and/or switchable from one side of the power supply apparatus to the other. Optionally, electrical connectors 112 are female/female or male/male.

Figure 7:
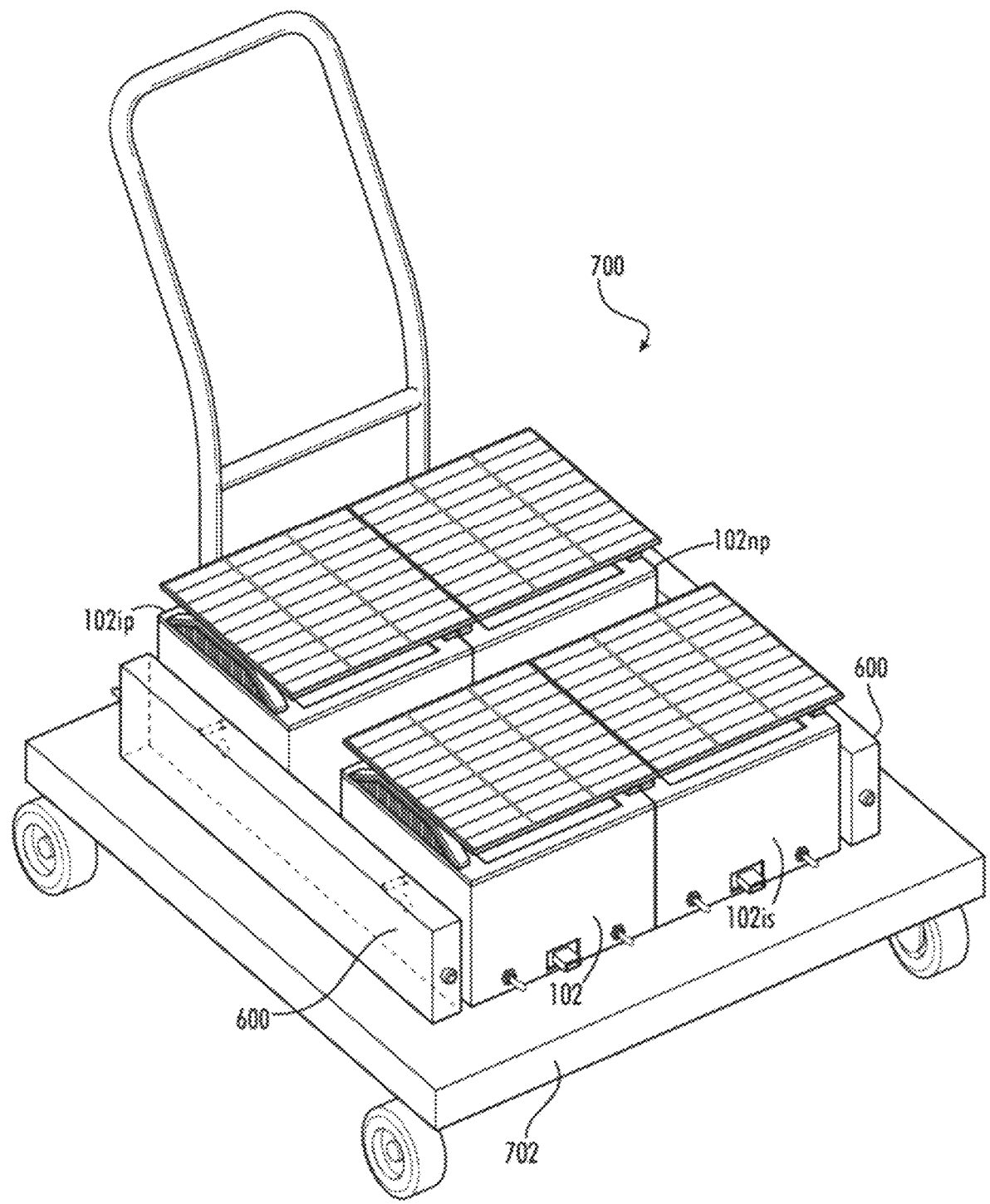
FIG. 7 is a perspective view of a system of modular power supply apparatuses, in a partially serial and partially parallel array.

FIG. 7 is a perspective view of a system 700 of modular power supply apparatuses 102, 102is, 102ip, 102np, in a partially serial and partially parallel array. It should be understood that the modular and/or interchangeable nature of the modular power supply apparatuses enables a mix and match operation whereby different system output voltage and/or current can be achieved by placing the power supply apparatuses in different combinations of serial and/or parallel. While FIG. 7 shows a 2×2 array, it could be 10×2, 2×10, 4×4, or any combination and/or in any number of total power supply apparatuses. Optionally, rows and/or columns of the power supply apparatuses contains different numbers of apparatuses, that is, there is an uneven number of apparatuses in the system/array and at least one row or column has a different number of apparatuses than a corresponding row or column.

In a further embodiment, system 700 may be placed on a tray or cart 702 or mobile platform, etc. for keeping the array in order, relatively stable with respect to each other and/or transportable (for example, for placing the array into the sun for charging and then for bringing the array indoors for use and/or protection from the outdoors). Again, simplicity is the desired outcome and system 700 being manually moved from location to location is preferable to having the system include motorized guidance/movement components.

Figure 8:
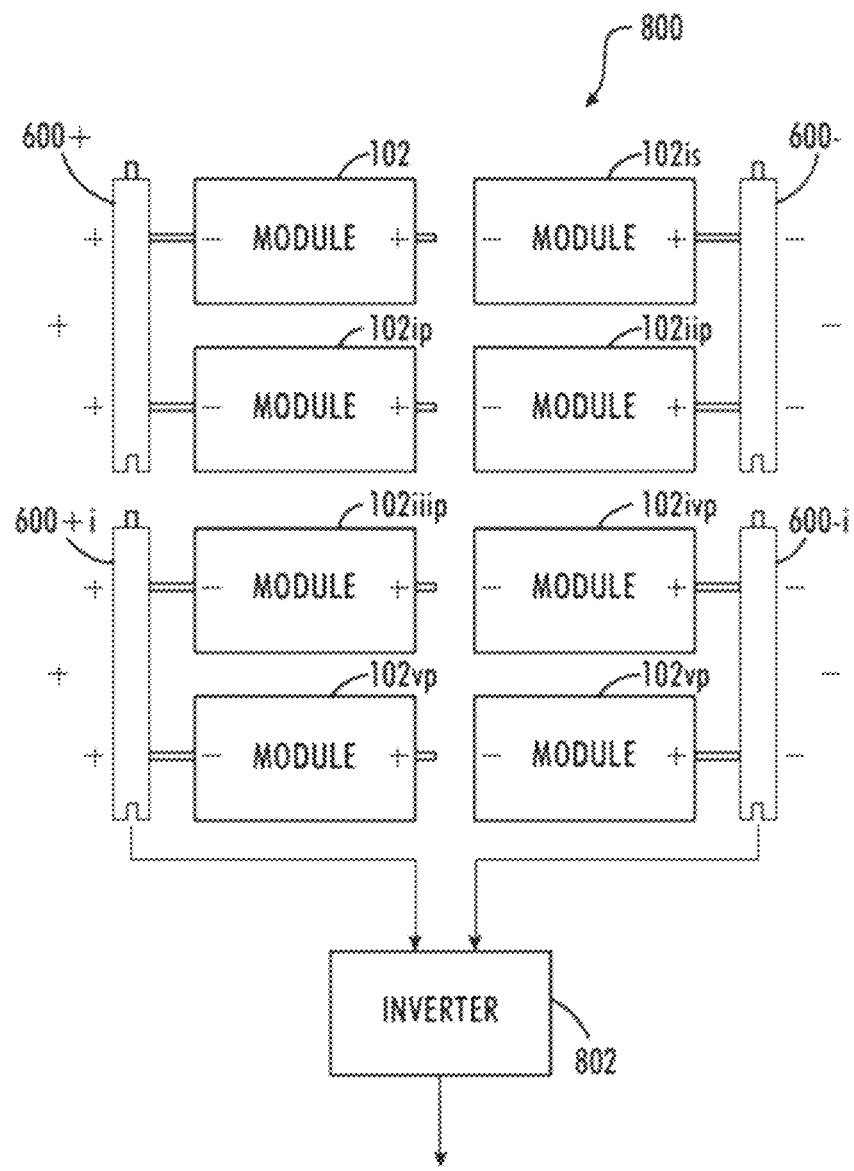
FIG. 8 is a schematic circuit diagram of a system of modular power supply apparatuses.

FIG. 8 is a schematic circuit diagram of a system 800 of modular power supply apparatuses 102 . . . 102vip. As can be seen in FIG. 8, power supply apparatuses 102, 102is are connected in serial to each other, power supply apparatuses 102ip, 102iip are connected in serial to each other, power supply apparatuses 102iiip, 102ivp are connected in serial to each other, and power supply apparatuses 102vp, 102vip are connected in serial to each other, forming 4 rows of serially connected power supply apparatuses. These 4 serially connected rows are, in turn, connected in parallel together using the connection rails 600+, 600+i on the positive side, and connection rails 600−, 600−i on the negative side. In some embodiments of the disclosure, the connection rails, as described elsewhere herein, interface electrically with the electrical connectors 112+, 112− of the power supply apparatuses. In some embodiments, connection rails also interface with the power supply apparatuses mechanically (and the power supply apparatuses also mechanically interface with each other), for example through the prong 202/depression 402 counterpart configuration described above. In some embodiments, toggle clamps may be used, additionally, alternatively and/or optionally, to provide additional mechanical stability to the connection rails. In an embodiment of the disclosure, the system/array 800 out puts DC power, which is converted to AC by the inverter 802 to supply AC power to an electrical appliance. It should be understood that, in some embodiments of the disclosure, output voltage could be adjusted to be anywhere between 110-220V, or even any other output voltage, as needed.

Figure 9:
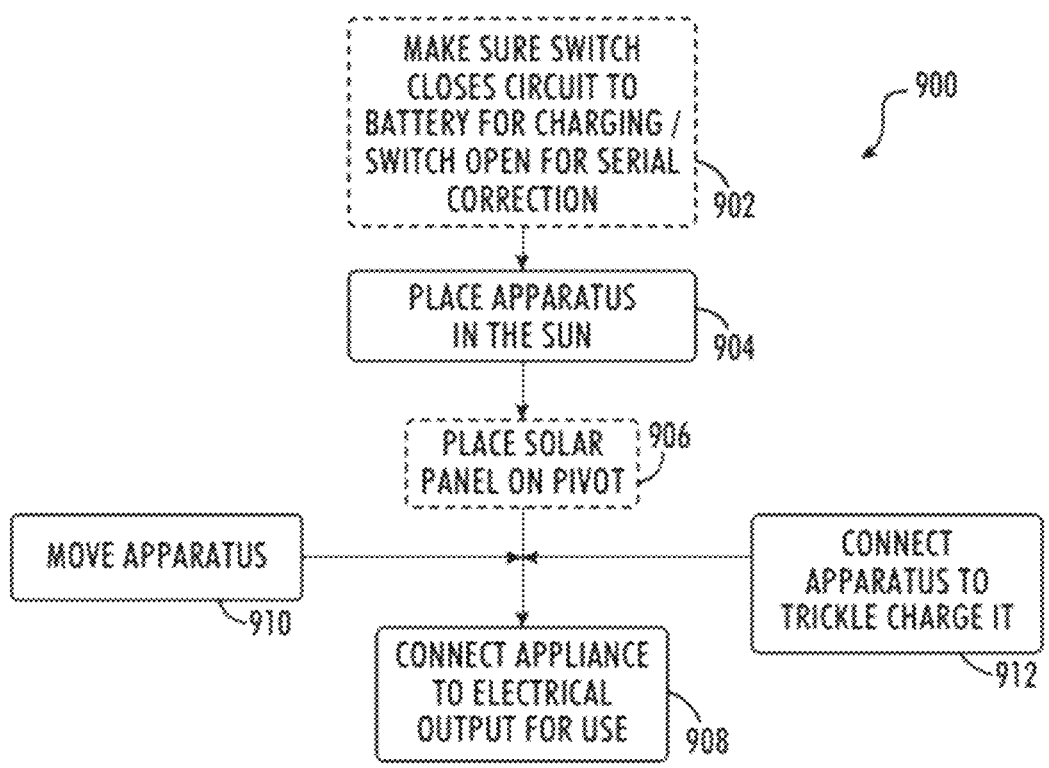
FIG. 9 is a flowchart of a method of using a modular power supply apparatus.

FIG. 9 is a flowchart 900 of a method of using a modular power supply apparatus 102. In an embodiment of the disclosure, a user of the apparatus optionally checks (902) to make sure that the switches 110 are in the appropriate positions for intended operation, for example, for batter 108 charging (or not) and/or for use in an array of multiple apparatuses (or not). In an embodiment of the disclosure, the apparatus 102 is placed (804) in the sun, or at least in partial sun, and, optionally, the solar panel 104 is pivoted (906) to increase the efficiency of solar power generation 5 (i.e., positioning more of the solar panel 104 in direct sun light) and changing position to ensure exposure remains steady.

In one embodiment, the power supply apparatus is used to charge (910) the battery 108 and/or charge (912) an external battery and/or to power (908) an electrical appliance plugged into the apparatus 102 through the electrical power output 114. In some embodiments, an electrical appliance is powered (908) after one or both of the internal battery 108 and the external battery have been charged (910, 912) at least a little by the power supply apparatus 102.

In some embodiments, the power supply apparatus, which is configured to be portable, is brought (914) indoors after charging operations, in order to power an appliance and/or for security/protection.

Figure 10:
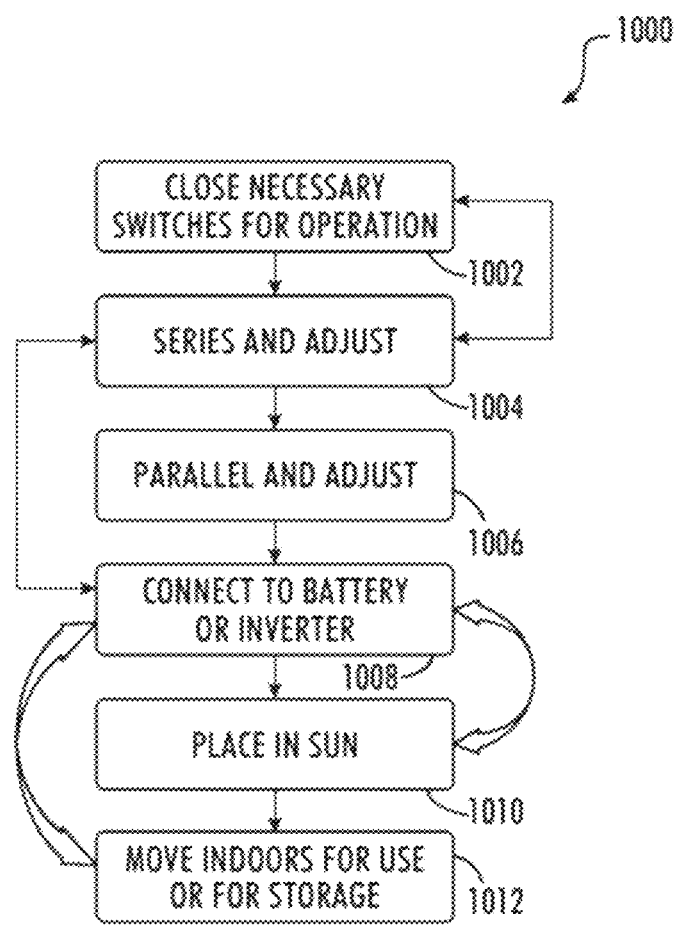
FIG. 10 shows a flowchart of a method of using a system of modular power supply apparatuses.
Figure 12:
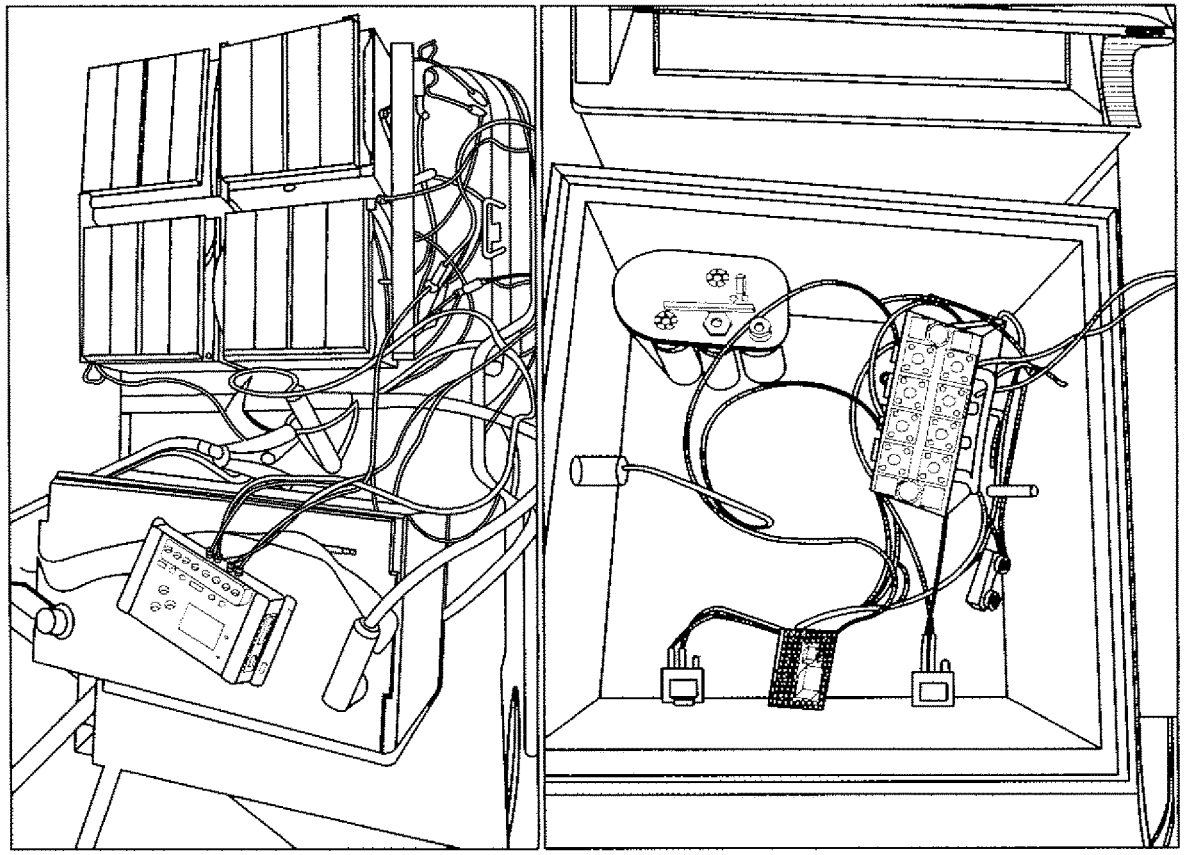
FIG. 12 shows a photograph of a modular solar power system of the current disclosure.
Figure 14:
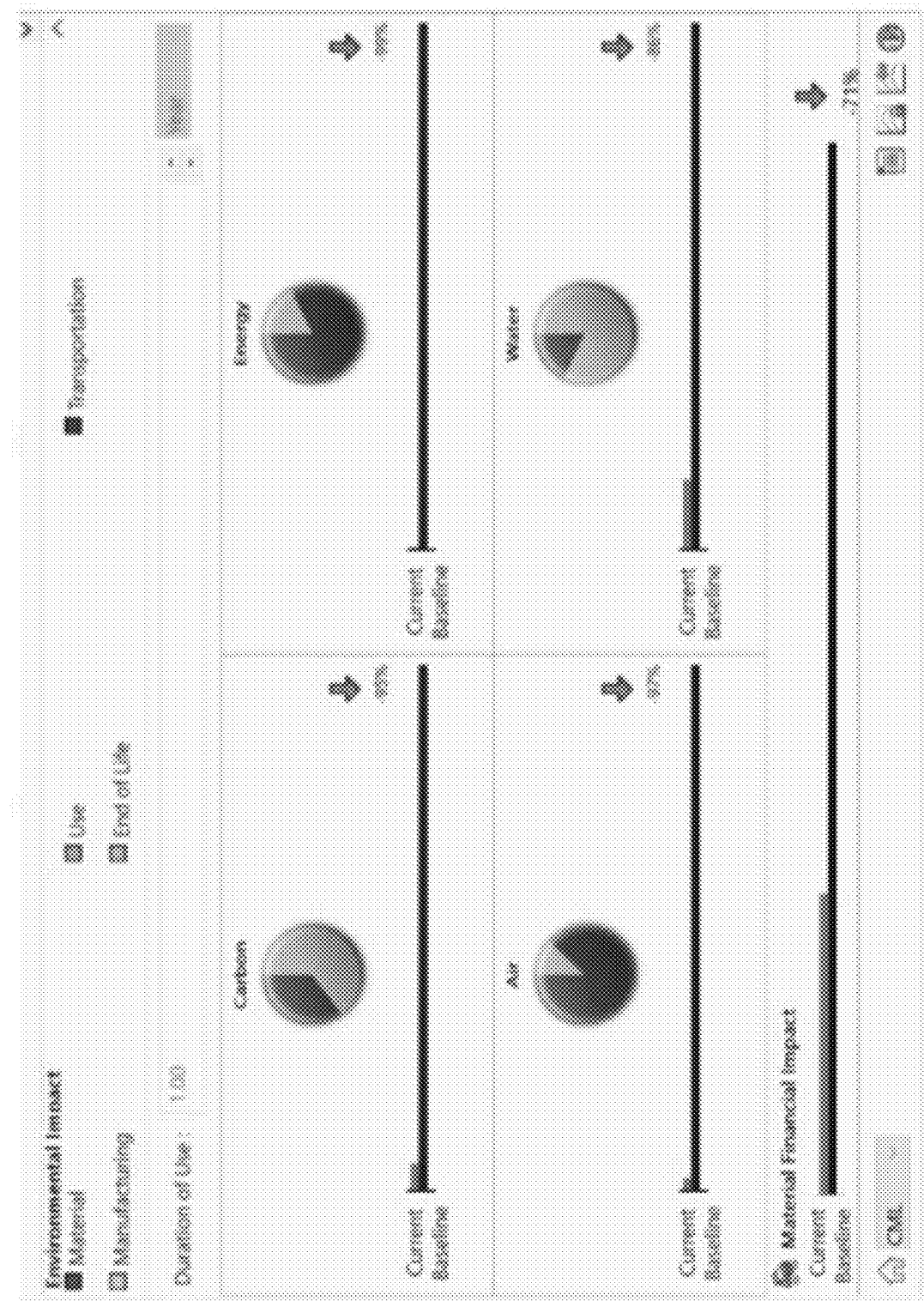
FIG. 14 shows a screenshot of a Sustainability Analysis of PLA v. Balsa Wood.

FIG. 10 is a flowchart 1000 of a method of using a system of modular power supply apparatuses. In an embodiment of the disclosure, the switches 110 are placed (1002) in the desired positions for operation (e.g. for battery 108 charging and/or for use in an array). In some embodiments of the disclosure, a plurality of power supply apparatuses are connected (1004) in series, for example using electrical connectors 112, additionally, alternatively and/or optionally, a plurality of power supply apparatuses are connected (1006) in parallel, for example using connection rails 600, wherein using a plurality of modular power supply apparatuses creates a system/array of apparatuses to increase/decrease voltage and/or current of power output to a battery (internal and/or external) and/or an electrical appliance connected (1008) to the system. In some embodiments of the disclosure, the system is placed (1010) in the sun for solar power generation functionality. Optionally, the system is placed in the sun before a battery or an electrical appliance is connected (1008) to the system. In some embodiments of the disclosure, the system is moved indoors for use or storage or for safety/security. Optionally, the system is moved (1012) indoors before a battery or an electrical appliance is connected (1008) to the system.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

Optionally, a network connection is provided as well. A display and/or a user input device such as a keyboard or mouse are optionally provided as well.

Various embodiments and aspects of the present disclosure as delineated hereinabove and as claimed in the claims section below find calculated support in the following examples.

Example

Reference is now made to the following Example, see FIG. 11, Table 1, of the construction of a modular power supply apparatus, in an embodiment of the disclosure, which together with the above descriptions illustrate some embodiments of the disclosure in a non-limiting fashion. The estimated cost for one (1) module in current form is $41 (USD). That cost could be reduced to $30 with local wood and a smaller internal battery supply.

Our current design for each solar module is a simple six inch cubic wooden box that can be joined through box joints or finishing nails Four millimeter banana jacks and sockets on opposite sides connect the boxes in series to increase voltage. The lid has a hole near the center top with angled handles so that the 3-watt (12 volt, 0.25 A) solar panels can be angled for optimal solar insolation at different times of the day. Wooden parallel rails connect the module series in parallel circuits to increase current and reduce the time needed to charge the pure gel batteries.

Within each module is an 8-port terminal block to route power from the solar panel to the banana jacks for charging the pure gel batteries. Two switches can divert the solar power to an internal battery back (6 AA batteries), which in turn power a 5 volt USB charger with step-down transformer, so that each module can function independently as a phone or study light charger.

One switch connects to the positive lead of the batteries to avoid draining electricity when using the external connections. The second switch connects to the positive lead in the external connection banana jack.

Sustainability

Sustainability of the modular power system was a significant concern for both the students in Sare Bilaly and the R2i2 InvenTeam. The modules were originally designed in CATIA and printed in ABS plastic to rapidly prototype and test the concept. 3D printing our solution allowed for modifications, such as adjusting the lid handles to allow the solar panel to be angled for optimal insolation. However, we knew that 3D printing was not available in southern Senegal, and needed to use locally available materials.

Madame Boiro and the local forestry manager of the Kolda Region were able to confirm that sustainable harvesting of local trees is permitted within the national forests. Forest regions are divided into different sections, and then one or two of those sections each year are allowed to be harvested for charcoal or for wood. Small businesses are encouraged to generate business from the permitted sections. At the end of that year, that land is off limits for harvesting for eight years. There are also many regulations for how the tree must be cut in order to let the seedlings grow, and size restrictions on what trees may be harvested. Given this forestry management, wood seemed like an optimal sustainable solution for the module boxes, as it is locally available and promotes regional entrepreneurship.

In order to quantify the module's sustainability, we imported our CATIA files into Solidworks, and ran the Sustainability application to analyze the impact of an ABS module on four indicators: energy, water, air, and carbon. We then changed the material to pine (the closest choice to the wood available in the Kolda region), and determined the percent change in environmental impact at each stage of the product life cycle.

It is important to note that there were some assumptions that had to be made in order to use Solidworks Sustainability. Sub-Saharan Africa is not available as a manufacturing or use region in Solidworks, which is likely due to insufficient available data. We therefore used Asia as the selected region, and adjusted the default transportation distances to reflect the actual distance between Columbia and Sare Bilaly (about 7000 km). Even with these limitations, it is clear that wood is the better choice from the environmental aspect of sustainability, based on the significant improvements to carbon, air, water and energy.

Materials and Methods

The design of our module was heavily influenced by the criteria and constraints we generated from our email conversations with Madame Boiro and her students. Our criteria for our modular solar chargers included that the disclosure is a new and unique concept, the reason being that currently available technologies are either not available or feasible in Sare Bilaly.

Another criteria we had was for the chargers to be portable. We wanted the modules to be able to be brought home by the students, taken out during the day, and bought in at night to keep it safe from theft, cattle herds, and sand and wind during the dry season. We also needed the solution to be easy to assemble and use because the students are the ones responsible for maintaining the charger.

Another criterion we created was ensuring that our disclosure has sufficient power to operate a copier or charge a battery that can operate the copier. Lastly, we wanted the solution to be adaptable for changing output or other equipment. While we are confident that we created something that will last a long time, we cannot assure that a part will never malfunction or need to be replaced. This is the reason why we wanted it to be adaptable and to use materials that can be found in the Kolda region as much as possible.

One of our biggest constraints was time: as the team is divided across five high schools, we had to maximize the time together to ensure progress would continue, and find ways to communicate remotely. Another constraint was the transportation of materials; both R2i2 and Sare Bilaly wanted the components of the modules to be as local as possible, but we needed to supply hard-to-find parts like the solar panels and electronic configuration parts. We had to find a balance of how to make a working solution with one that will be sustainable for years to come.

We had a limited budget for shipping, and discovered specific restrictions to shipping batteries. Another constraint was the available energy sources; most people in the Kolda region use charcoal or kerosene for their energy needs. Delivery of kerosene can be unreliable due to politics and weather, and we wanted to avoid charcoal if possible due to pollution. Initially, solar energy and bioenergy were our best options in terms of available energy for our disclosure (because of the large number of cattle in the area so cow manure is available). However, in the final design, we decided to utilize only solar power because the microbial fuel cells (bioenergy) were not producing enough current and were hard to maintain.

Our final design meets the specifications requested by Sare Bilaly in that the modules are portable, adaptable for future needs, and can be easily replicated with locally available materials, with the exception of the electronic components. However, it is possible to find most of the electric parts in Dakar, and we anticipate that the few items not currently available in the Kolda region, such as solar cells, will become more available in the future. While we considered reducing the size of the module itself once we eliminated the bioenergy component, we opted to keep the box sufficiently large to make it easier to repair loose connections and replace internal batteries. With each design decision, we first considered what materials and skills might be available, and secondly chose items based on weight to reduce shipping costs. The adjustable lid takes into consideration that the modules will have to spend most of the day outside to fully charge, so the solar cells will therefore need to have an adjustable angle to optimize capture of energy from the sun as it changes position throughout the day.

DISCUSSION

We ensured that the device meets the needs of the beneficiary by first testing the available voltage and current from each module with a multimeter, then confirming power by charging and operating a USB light, cell phone, and photocopier with the system. We then calculated the charging and operating times for individual modules and for the larger battery system. Actual charge rates were verified with a USB multimeter. Based on our observed charging rates, individual modules take between eight and nine hours to fully charge the internal battery pack. Given that Sare Bilaly experiences more direct sunlight than South Carolina, their charging times are likely to be less than what we observed. On the other hand, power output decreases with temperatures over 25° C., so actual charging times in Sare Bilaly will need to be tested and reported back in order to make any needed adjustments for efficiency. When the internal battery is fully charged, the USB charger can operate at one hour to charge a cell phone (5 V, 1 A), and for ten hours with a LED light (5 V, 100 mA).

While latitude and temperature will also affect the charging rates for the pure gel deep cycling batteries for the photocopier, the main consideration in charging times is how many modules are linked in parallel, which in turn determines the current. The desktop printer/photocopier that will be used in Sare Bilaly had a reported power requirement of 50 watts; however, when we researched this, we discovered that the reported requirement was for standby mode; operating power is closer to 400 watts, with starting surges closer to 900 watts.

In order to accommodate this, we had to switch from a 750 watt inverter to a 2000 watt inverter. The change in power need does not affect the batteries needed, but it does impact the amount of time the batteries can run the photocopier. Our current estimate, verified with a Samsung multifunction printer that has the same power requirements, is that the fully charged pure gel batteries can run the photocopier for two hours.

It is expected that during the life of a patent maturing from this application many relevant solar power related technologies will be developed and the scope of the terms solar power and/or solar panel is intended to include all such new technologies a priori.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad 5 scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation 10 or identification of any reference in this application shall not be construed as an admission that such reference is available as prior art to the present disclosure. To the extent that section headings are used, they should not be construed as necessarily limiting.

All patents, patent applications, published applications, and publications, databases, websites and other published materials referred to throughout the entire disclosure herein, unless noted otherwise, are incorporated herein by reference in their entirety.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A system comprising at least one modular power supply apparatus, the at least one modular power supply apparatus comprising:
   an outer shell, comprising:
     at least one removable solar panel affixed to an exterior of the outer shell capable of being repeatedly repositioned manually on the outer shell and in communication with;
     at least one terminal block contained in the interior of the outer shell and in communication with at least one switch and at least one male electrical connector and at least one power output;
     at least one rechargeable battery contained in the interior of the outer shell and in communication with the at least one male electrical connector, the at least one switch, and the at least one power output;
     at least one connecting rail, configured to connect a plurality of modular power supply apparatuses, wherein the at least one connecting rail comprises at least two male connecting rail electrical connectors to engage at least one female electrical connector formed on the at least one modular power supply apparatus and to engage at least one female electrical connector on a separate and distinct second modular power supply apparatus.

2. The system of claim 1, wherein at least one rechargeable battery is an external battery located outside the outer shell of the at least one modular power supply.

3. The system of claim 1, wherein at least two modular power supply apparatuses may be connected in parallel, series, or both parallel and series.

4. The system of claim 1, wherein the at least one modular power supply apparatus is formed to removably engage and disengage from the separate and distinct second modular power supply apparatus.

5. The system of claim 1, wherein the at least one modular power supply and the separate and distinct second modular power supply have mated electrical connectors to enable connection to one another reversibly.

6. The system of claim 1, further comprising at least one inverter.

7. The system of claim 1, wherein the solar panel is only manually repositioned via changing position of the at least one solar cell on an attachment.

8. The system of claim 1, wherein the at least one modular power supply apparatus is mobile.

9. The system of claim 1, wherein at least one other connecting rail comprises at least two female connecting rail electrical connectors to engage at least one male electrical connector formed on one of the plurality of modular power supply apparatuses and at least one male electrical connector formed on another one of the plurality of modular power supply apparatuses.

* * * * *